(12) United States Patent
Ciolczyk et al.

(10) Patent No.: US 9,222,605 B2
(45) Date of Patent: Dec. 29, 2015

(54) DUCTING FOR A FLUID TRANSFER PIPELINE FOR AN AIRCRAFT OR SPACECRAFT, METHOD FOR PRODUCING SAME AND AERONAUTICAL STRUCTURE INCORPORATING SAME

(71) Applicant: Hutchinson, Paris (FR)

(72) Inventors: Jean-Pierre Ciolczyk, Montargis (FR); Marc Dolez, Olivet (FR); Bertrand Florentz, Paucort (FR)

(73) Assignee: Hutchinson, Paris (FR)

( * ) Notice: Subject to any disclaimer, the term of this patent is extended or adjusted under 35 U.S.C. 154(b) by 0 days.

(21) Appl. No.: 14/448,144

(22) Filed: Jul. 31, 2014

(65) Prior Publication Data

US 2014/0338816 A1 Nov. 20, 2014

Related U.S. Application Data

(62) Division of application No. 12/577,980, filed on Oct. 13, 2009, now Pat. No. 8,920,704.

(30) Foreign Application Priority Data

Oct. 17, 2008 (FR) ...................... 08 05782

(51) Int. Cl.
*B29D 23/00* (2006.01)
*F16L 9/133* (2006.01)
(Continued)

(52) U.S. Cl.
CPC ................. *F16L 9/133* (2013.01); *B29C 49/04* (2013.01); *B29C 49/26* (2013.01); *B29C 49/44* (2013.01); *B29C 53/083* (2013.01); *B29C 65/08* (2013.01);
(Continued)

(58) Field of Classification Search
None
See application file for complete search history.

(56) References Cited

U.S. PATENT DOCUMENTS 3,200,023 A 8/1965 Cilker
3,468,346 A 9/1969 Onifer, Jr. et al.
(Continued)

FOREIGN PATENT DOCUMENTS

DE 103 59 912 A1 7/2005
EP 0 492 129 A 7/1992
(Continued)

OTHER PUBLICATIONS

International Search Report from French Application No. 08 05782 filed Oct. 17, 2008 (dated August Apr. 5, 2009).
(Continued)

*Primary Examiner* — Monica Huson
(74) *Attorney, Agent, or Firm* — Alston & Bird LLP

(57) ABSTRACT

A ducting and associated method is provide in which the ducting includes a pipe with a thermoplastic or thermoplastic elastomeric layer and a reinforcing layer. The pipe has a curved or bent geometry and the reinforcing layer is made of a composite material based on reinforcement in intimate and direct contact with the subjacent layer. The geometry is obtained by hot forming the inner layer to give the geometry, and the reinforcement is either impregnated with a thermosetting matrix to form a thermosetting composite, or reinforcing fibers are intermixed with thermoplastic fibers or powders, or impregnated with a plastic polymeric coating that is curable chemically. Alternatively, the inner layer is first covered with the reinforcing layer in which the reinforcement includes reinforcing fibers intermixed with a thermoplastic material in the form of fibers, film or powder is blow-molded to give the pipe its final geometry.

14 Claims, 1 Drawing Sheet

(51) Int. Cl.
  *B29C 49/04* (2006.01)
  *B29C 49/26* (2006.01)
  *B29C 49/44* (2006.01)
  *B29C 53/08* (2006.01)
  *B29C 65/08* (2006.01)
  *B29C 65/66* (2006.01)
  *B29C 70/30* (2006.01)
  *B29C 70/44* (2006.01)
  *B64D 37/00* (2006.01)
  *B29K 77/00* (2006.01)
  *B29K 275/00* (2006.01)
  *B29K 307/04* (2006.01)
  *B29L 23/00* (2006.01)

(52) U.S. Cl.
  CPC ............... *B29C 65/66* (2013.01); *B29C 70/30* (2013.01); *B29C 70/443* (2013.01); *B29C 70/446* (2013.01); *B29D 23/001* (2013.01); *B29K 2077/00* (2013.01); *B29K 2275/00* (2013.01); *B29K 2307/04* (2013.01); *B29K 2995/0058* (2013.01); *B29K 2995/0069* (2013.01); *B29L 2023/004* (2013.01); *B29L 2023/22* (2013.01); *B64D 37/005* (2013.01); *Y10T 428/1393* (2015.01)

(56) References Cited

U.S. PATENT DOCUMENTS

| | | |
|---|---|---|
| 4,514,244 A | 4/1985 | Shaefer et al. |
| 7,132,141 B2 | 11/2006 | Thullen et al. |
| 7,316,427 B2 | 1/2008 | Nakagawa et al. |
| 2002/0017333 A1 | 2/2002 | Wellman et al. |
| 2005/0257847 A1 | 11/2005 | Francesco et al. |
| 2009/0014081 A1 | 1/2009 | Limas |

FOREIGN PATENT DOCUMENTS

| | | |
|---|---|---|
| EP | 1 264 717 A | 12/2002 |
| EP | 1878 562 A1 | 1/2008 |
| GB | 1 031 640 A | 6/1966 |
| WO | WO 2006/136597 A1 | 12/2006 |

OTHER PUBLICATIONS

Machine Translation of EP 1264717, Ehs, Dec. 2002.
European Search Report for Application No. EP 09 29 0773 dated Feb. 24, 2010.
Office Action for Application No. EP 09 290 773.2 dated May 24, 2011.

DUCTING FOR A FLUID TRANSFER PIPELINE FOR AN AIRCRAFT OR SPACECRAFT, METHOD FOR PRODUCING SAME AND AERONAUTICAL STRUCTURE INCORPORATING SAME

CROSS REFERENCE TO RELATED APPLICATIONS

This application is a divisional of currently pending application Ser. No. 12/577,980, filed Oct. 13, 2009, now U.S. Pat. No. 8,920,704, which claims priority to French Application No. 08 05782, filed Oct. 17, 2008, the entire disclosures of said applications being hereby incorporated herein by reference.

FIELD

The present invention relates to a bent and/or curved ducting, in particular for a fluid transfer pipeline for an aircraft or spacecraft, such as a fuel pipeline, mounted in or under the wings of an aircraft, an aeronautical structure incorporating this ducting and a method for producing same. The invention relates more particularly to three-dimensional ductings (i.e. of which the axis of symmetry from one end to the other extends in three dimensions).

BACKGROUND

Fuel pipelines of current aircraft are usually made of metal (e.g. aluminum, stainless steel or titanium), as are the wings in which they are housed. Nevertheless, for several years now wings and fuel pipelines have started to be designed in composite materials, so as to lighten as much as possible these pipelines and the wing units incorporating them (e.g. the wing unit, central box section or engine strut) or to reduce the electrical conductivity of these pipelines to prevent risks of lightning strike, notably in the case where these pipes are fixed to the structures that are themselves composite and are therefore less conductive than metal.

Reference may be made for example to document WO-A1-2006/136597 for an example of a composite ducting comprising two coaxial inner and outer conduits separated by struts and that are at least partly made of a composite thermosetting material, such as an epoxy resin reinforced by carbon fibers. Mention may also be made of document EP-A1-1 878 562 that teaches the production of ducting for air-conditioning lines designed for aircraft, incorporating pipes with thermoplastic or thermosetting plies, for example based on a phenolic resin for the thermosetting matrix.

Currently, most three-dimensional pipes are made of metal, being obtained by bending or welding. They are thus relatively heavy, on account of the high density of the metallic material used. Composites thus represent a valuable solution for lightening these pipes, notably for the pipes of fuel lines or hydraulic lines or aeronautical extinguisher lines, where weight is an important factor in performance, economy and the reduction of consumption and emissions.

However, when pipes are made of a composite material with a three-dimensional shape, their production requires:
- a rigid mold associated with an inflatable bag of which the role is to apply the wall of the pipe with pressure into the mold, or
- a rigid core (of the extractable, fusible or soluble type for example) on which either dried reinforcing fibers are draped that are infused under vacuum and then cured in an oven, or prepregs, (i.e. material in sheets impregnated with a thermosetting resin of which polymerization is incomplete) that are consolidated and then cured in an autoclave.

A major disadvantage of these known pipes and the methods for producing them lies in their relatively high cost, since they require costly equipment (molds and bags in particular) as well as costly cores (case of extractible cores, for example), cores that have to be replaced regularly after producing several tens of parts (e.g. inflatable bags, flexible mandrels) or even lost cores for each part produced (case of soluble or fusible cores).

SUMMARY

An object of the present invention is to provide ducting that enables pipelines or tubing to be made with complex three-dimensional shapes that also overcomes these disadvantages, the ducting having at least one multilayer pipe comprising a radially inner layer made of thermoplastic material or thermoplastic elastomer that is leakproof and chemically resistant to the fluids transported, and at least one reinforcing layer situated radially above the inner layer.

To this end, a ducting according to the invention is such that the pipe has a curved and/or bent, preferably three-dimensional, geometry and may be complex, and in that the reinforcing layer is made of a composite material based on reinforcing means that are preferably fibrous (e.g. carbon, glass or aramid fibers) that are in intimate and direct contact with the subjacent layer, such as the inner layer, said geometry being obtained by one or other of the following two methods a) and b):

a) the inner layer is previously hot formed independently of the reinforcing layer so as to pass from an initial rectilinear geometry to this curved and/or bent geometry, said reinforcing means being of choice:
  (i) impregnated with a thermosetting matrix, the reinforcing layer forming a thermosetting composite with a thermosetting matrix having a curing temperature less than the melting point of said subjacent layer, or
  (ii) either the reinforcing fibers are intermixed with thermoplastic fibers or powders, or are impregnated with a plastic polymeric coating that is curable chemically, the reinforcing layer forming in both these cases a thermoplastic composite with a thermoplastic matrix having a transformation temperature less than that of said subjacent layer; or
b) the inner layer, in its initial rectilinear geometry, is first of all covered with the reinforcing layer in which said reinforcing means are reinforcing fibers intermixed with a thermoplastic material in the form of fibers, a film or powder, and this inner layer covered in this way is then blow-molded after being softened in order to give the pipe its curved and/or bent geometry, the reinforcing layer obtained forming a composite with a thermoplastic matrix.

It will be noted in a general manner that the ducting according to the invention, whether it be obtained by method a) or b), is such that its inner layer is functional both for its function of resistance to the fluid transported as well as for direct application of the reinforcing layer by intimate contact (e.g. by bag molding or drape-forming). As will be given in detail in the remainder of the present description, this inner layer is not only intimately connected to the remainder of the pipe, but additionally acts in its production by forming a core for the in situ application of this reinforcing layer.

With reference to alternative (i) of method a), it will be noted that the essential value of this thermoplastic/thermosetting hybrid structure consists of being able to cure the thermosetting matrix of the reinforcing layer without causing the inner layer to melt. For example, an epoxy resin may be cured quite rapidly at temperatures close to 140° C. on a thermoplastic inner layer of which the melting point is for example above 170° C. (case of a polyamide).

With reference to method b), it will be noted that the composite with a thermoplastic matrix that is formed by the corresponding reinforcing layer, may be such that this matrix has a transformation temperature varying within a wide range that may for example be close to that of the subjacent layer, such as the inner layer. This method b) thus has, compared with method a), the advantage of not involving a limitation to the transformation temperature of the matrix used. Another advantage of this method b) is that it is possible, by means of the blow-molding employed for obtaining the bent and/or curved geometry, to consolidate the thermoplastic matrix even better, to the point where it is given the polished mirror appearance of the mold.

An important advantage of this invention will also be noted, which is that regulation of the mechanical properties, for example the resistance to pressure/reduced pressure or rigidity of the pipe, may be achieved by adjusting the number and thickness of the reinforcing means chosen but also by placing reinforcements in very precise places in the form of localized sleeves.

Advantageously, said reinforcing means may be of the fibrous type, being preferably chosen from the group consisting of one or more braids, one or more knitted fabrics, one or more fabric plies, unidirectional ribbons or webs, complexes of the type with a non-woven core either side of which mats or fabrics are sewn or knitted (e.g. with the trade name "Rovicore"), complexes based on thermosetting reinforcements (e.g. with the trade name "Injectex") and combinations of these reinforcing means, for example with a damping material such as an elastomer.

Even more advantageously, said reinforcing means may comprise one or more cylindrical braids optionally separated from each other by layers damping vibrations, the or each braid being preferably made of carbon or aramid for their lightness.

Also advantageously, the braiding angle that the or each braid makes with the axis of symmetry of the pipe, will be substantially equal to 54° on at least one portion of the pipe, so as to prevent flow with temperature of the subjacent layer, such as the inner layer or the thermoplastic matrix of the reinforcing layer, and to maintain this braid in equilibrium on these layers when they are put under pressure. It will however be noted that this braiding angle may vary within more or less large proportions around 54° along the pipe, notably at the location of changes in radius (e.g. bends or curved portions) and possible changes in pipe diameter.

Preferably, the inner layer is based on at least one thermoplastic polymer chosen from the group consisting of polyamides (PA), polyetherimides (PEI), phenylene polysulfides (PPS), polyetheretherketones (PEEK), polyetherketoneketones (PEKK) and mixtures thereof.

In a more preferred manner, the inner layer is based on at least one polyamide consisting of PA6, PA6.6, PA11, PA12 and mixtures thereof, that has a low glass transition temperature Tg, for example close to 45° C. (above which the polyamide is subject to flow), said braiding angle of 54° preventing this inner layer from flowing with temperature at higher temperatures of use. In point of fact, this angle makes it possible to use these very low cost thermoplastic polymers of which the Tg temperature is situated below the maximum temperatures of use, while their melting point is above for example 170° C., without the risk of flow, even when used continuously at 100° C. for example, by virtue of the dimensional blocking of the inner layer by the reinforcing means.

As a variant, the inner layer may be based on at least one thermoplastic elastomer, preferably an alloy of thermoplastic vulcanizates (TPV).

The material of the inner layer is of course equally chosen for its good adhesion to the thermosetting matrix used for consolidating the reinforcing means within the reinforcing layer.

It will be noted that if the thermosetting resins (e.g. epoxy resins, bismaleimides (BMI), phenolics, polyesters, vinylesters and polyetherimides (PEI)) can at the limit be used in the inner layer, the latter is advantageously made of a thermoplastic polymer or a thermoplastic elastomer, since these polymers have:
  better chemical resistance to the fluids conveyed,
  better leakproofness even at very low thicknesses (between 0.3 and 1 mm),
  greater lightness (density often equal to 1 instead of around 1.5 for thermosetting resins),
  better impact resistance, and
  ease of extrusion and therefore reduced cost.

According to a preferred embodiment of the invention, the reinforcing means of the reinforcing layer are directly drape-formed or bag-molded on the inner layer which then forms a functional drape-forming core.

According to another embodiment of the invention, the pipe includes, radially between the inner layer and the adjacent reinforcing layer, at least one intermediate layer with the electrical conductivity adjusted, for example provided so as to reduce the overall electrical conductivity of the pipe as regards the risk of lightning strike and of explosion of the fluid conveyed, or conversely to increase it, for example as regards the requirement for electrostatically discharging fluid passing through the pipe, said reinforcing means of the reinforcing layer being directly drape-formed over the subjacent intermediate layer.

With reference to alternative (i) of method a) according to the invention, the reinforcing means that are included in the reinforcing layer are advantageously directly drape-formed or bag-molded over the subjacent layer, such as the inner layer.

According to a first example of the invention, these reinforcing means are advantageously drape-formed dry and infused under vacuum with said thermosetting matrix overmolded in the viscous liquid state, by a method known as infusion. In this case, the inner layer may advantageously be based on at least one polyamide chosen from the group consisting of PA6, PA6.6, PA11, PA12 and mixtures thereof for example, this inner layer having a minimized thickness in relation to the pressure reduction used for this vacuum infusion (relative pressure less than or equal to 1 bar). In point of fact, this thickness may advantageously be distinctly less than 1 mm for an inner layer made of non-reinforced PA6, 6.6, 11 or 12, 50 mm in diameter for example. Thus, the pipe obtained may be particularly light, due to the smallest thickness required for this to withstand a pressure of several bars in an autoclave.

According to this first example, these reinforcing means are preferably infused under vacuum with a liquid thermosetting resin chosen from the group consisting of epoxy, bismaleimide, phenolic, polyester, vinylester, polyetherimide resins and mixtures thereof. Even more preferably, the reinforcing layer forms a thermosetting epoxy resin/carbon composite or epoxy/aramid or epoxy/glass composite, being for example formed of one or more braids made of carbon or aramid or glass infused with an epoxy resin, for example.

In relation to this first example, it will be noted that the inner layer forms a core both for the drape-forming and infusion of these reinforcing means.

It will also be noted that these reinforcing means, such as one or more braids, which are drape-formed dry over the subjacent layer, such as the inner layer, thus easily take up the radii of curvature of this previously curved, molded and/or bent layer.

It will also be noted that, for fuel pipelines where electric arcs must be prevented that may cause explosions, the thermoplastic material or thermoplastic elastomer of the inner layer may be made conducting, for example by adding fillers (e.g. carbon black, graphite, etc) or conducting fibers (e.g. short, long or continuous carbon fibers) so as to evacuate electrostatic charges generated by movements of fluid inside the pipe.

Similarly, overlapping conductive reinforcements, such as braids, could be added during infusion so as to enable electrostatic charges to be led towards the fixing supports or neighboring structures without causing arcing to these structures.

According to a second example of the invention, these reinforcing means are advantageously pre-impregnated with said thermosetting matrix, consolidated in contact with the subjacent layer of the pipe and then cured. It will however be noted that this pre-impregnation has the relative disadvantage of involving higher cost than that inherent in the infusion technique.

With reference to alternative (ii) of method a) according to the invention, the reinforcing layer and the reinforcing means that are included therein may be formed:
  either of a continuous composite element such as a strip that contains said reinforcing fibers intermixed with said thermoplastic fibers or powders, and which is wound around the inner layer,
  or of one or more braids impregnated with said plastic polymeric coating, cured chemically, preferably by reaction injection molding "RIM" for example based on a polyurethane (these braids being for example made of carbon fibers).

It will be noted that the transformation temperature of the thermoplastic matrix that is chosen to be less than that of the inner subjacent layer, prevents any deformation or changes to the geometry or properties of this inner layer during consolidation of the reinforcing layer that is performed above its melting point. The thermoplastic matrix or curable oligomers may be in a liquid form so that they can be infused, or may be used in any other impregnating method permitting compacting and curing at very low pressures.

With reference to method b) according to the invention, said reinforcing fibers, such as carbon, glass or aramid fibers, are intermixed with said thermoplastic material to form the reinforcing layer that is drape-formed or bag-molded over the subjacent layer, such as the inner layer.

Advantageously, the pipe may optionally include an outer sheath defining its radially outer surface, this sheath being for example designed to improve the physical properties and chemical resistance of the pipe and/or to damp vibrations received and/or to ensure electrical insulation and/or thermal insulation and/or to improve the impact resistance of the pipe.

According to another feature of the invention, the ducting may include flanges for connecting the pipe to the remainder of the pipeline, each flange being made of a metallic, thermoplastic or composite thermoplastic material and being integrated with said reinforcing means while partially covering the latter by direct overmolding at one end of the pipe, so that these reinforcing means ensure the continuity of the ducting to mechanical forces.

These reinforcing means may then be gripped on their two radially inner and outer faces by two collars that each flange carries, and are secured to these collars during infusion by said thermosetting matrix overmolded on these reinforcing means, with reference to alternative (i) of step a) according to the invention. Each free end of these reinforcing means, such as a braid, is in this way intimately bonded to the corresponding flange during this single infusion operation, in this way conferring maximum mechanical strength to the pipe provided with flanges.

Preferably, each flange may be made of a thermoplastic or composite thermoplastic material and is shrunk-on or rotation welded onto the radially inner face of the inner layer of the pipe. It will be noted that this shrinking-on may be facilitated by the thermoplastic elastomeric nature of the inner layer, and as a variant, these flanges may be fixed by adhesive, gripped or shrunk-on, since the thermoplastic has the advantage of remaining deformable, contrary to a thermoset.

Equally preferably, each flange may contain electrically conductive inserts, for example metallic, or of the conductive braid type, on which it is overmolded, so as to obtain a specific electrical conductivity for the ducting that is made in this way more or less conducting or insulating, or so as to be able to connect it to adjacent structures (grounding).

The flanges may be filled or not with fibers or fillers that may have several functions:
  for reinforcement: short or long fibers, and
  for electrical conductivity: various fillers may be incorporated in these flanges to adjust their conductivity.

In addition, the form and inner contacts of the flanges may also make it possible to ensure electrical equipotentiality between the inside and outside of the pipe.

An aeronautical structure according to the invention (e.g. an aircraft wing) that contains fluid transfer pipelines (e.g. hydraulic pipelines for fuel, oils or extinguisher fluids) is characterized in that one or more ducts of at least one of these pipelines is as defined above.

A method according to the invention for producing ducting as defined above substantially comprises the following successive steps:
  A) forming the thermoplastic or thermoplastic elastomeric inner layer (filled or not) preferably by extrusion, with optional deposition of at least one intermediate layer on this inner layer, so as to obtain a blank with a geometry that is either rectilinear, curved and/or bent (preferably three-dimensional),
  B) bag molding or drape-forming in situ said reinforcing means directly onto this blank, which constitutes in this way a functional core for bag molding or drape-forming,
  C) consolidation in situ of these reinforcing means in contact with this core by a thermosetting or thermoplastic matrix with optionally, only in the case where step B) is carried out on a blank with rectilinear geometry, blow-molding the rectilinear core softened by preheating following this step B) so as to obtain a multilayer structure with curved and/or bent geometry, then
  D) curing and/or cooling this multilayer structure so as to obtain the curved and/or bent pipe with a composite reinforcing layer.

With reference to the aforementioned method a) according to the invention, the blank formed in step A), initially with a rectilinear geometry, is subjected to hot forming so as to obtain, in view of step B), a core designed for bag molding or drape-forming that is previously curved and/or bent with a preferably three-dimensional geometry.

This hot forming may be carried out:
- either by locally heating the blank for bending before preheating,
- or by heating all the blank to a predetermined temperature enabling it to be softened and by blow-molding or by thermoforming in a mold under a very low internal pressure and without an inflatable bag since it is the tube itself, formed in this way, that takes its place.

It will be noted that this hot forming only requires very low forces or pressures, by virtue of the softening of the previously heated thermoplastic or thermoplastic elastomeric blank and makes it possible to dispense with any other inner core.

With reference to alternative (i) of the aforementioned method a), steps B) and C) are put into practice by drape-forming the reinforcing means, such as one or more braids, for example made of carbon, on the curved and/or bent core formed in A), with:
- either dry drape-forming of the reinforcing means followed by infusion of these under vacuum in step C) by means of said thermosetting matrix overmolded in the liquid state, such as an epoxy resin, this core constituting in this way a functional core for drape-forming and infusion,
- or the use, for this drape-forming, of a prepreg that is consolidated in contact with the core in step C).

The principle of the invention thus consists of separating the production of the inner layer from that of the outer reinforcing layer and, according to this alternative (i) of method a), of making use of this previously formed inner layer as a core for drape-forming and infusion during production of the reinforcement. In a general manner, with reference to methods a) and b) of the invention, the inner functional tube provides in both cases the role of mandrel or support on which the reinforcing layer is produced. It ensures chemical resistance and leakproofness to fluids inside the pipe, and also enables the internal conductivity of the pipe finally obtained to be adjusted.

Even more advantageously for this alternative (i), it is chosen to employ this dry drape-forming followed by infusion, using a flexible sheet or vacuum bag for this.

With reference to alternative (ii) of method a) according to the invention, steps B) and C) are put into practice:
- either by winding around the core a continuous composite element such as a thread or strip that contains said reinforcing fibers intermixed with said thermoplastic fibers or powders,
- or by impregnating said reinforcing means by means of said plastic polymeric coating that can be chemically cured, preferably by molding of the "RIM" reaction type, for example by means of a polyurethane.

With reference to method b) according to the invention, step B) is put into practice directly on a blank with a rectilinear geometry obtained in step A), without hot-forming this blank.

As previously indicated, the inner layer is then first of all formed to an initial rectilinear geometry (i.e. neither curved nor bent), which has the advantage of reducing the production method for the pipe. This inner layer of the reinforcing layer is then covered with a fibrous material (for example by drape-forming, "bandaging" or bag molding with a preform or a braid) intermixed as it is with reinforcing fibers (e.g. carbon, glass or aramid) with a thermoplastic material formed of other fibers, a film or a powder. The structure obtained in this way is preheated to its softening temperature and is placed in a mold (of which the cavity has a diameter slightly greater than that of the structure) where it is subjected to blow-molding in order to give it the desired curved and/or bent geometry.

It will be noted that the tube formed by the inner layer does not, under these conditions, exhibit the slightest risk of collapsing on account of its being under pressure, while this risk, although low, exists with method a) according to the invention that calls for a reduction in pressure for the consolidation step.

As regards the curing step D), this is carried out under vacuum in an oven, i.e. without having to use an autoclave or other complex equipment.

In a general manner, it will be noted that this method according the invention enables an easy addition to be made:
- of local reinforcement (e.g. braids, fabrics, unidirectional strips, knitted fabrics) in the reinforcing layer without affecting the production equipment used,
- of a damping intermediate layer, preferably placed between two fibrous reinforcements so as to damp any vibratory modes of the pipes (cf. for example excitation by windmilling with aircraft that have lost a blade on a jet engine), and
- of added end flanges.

According to another feature of the invention, this production method may additionally include the securing in step C) of connecting flanges of the pipe to the reinforcing means, so that each flange at least partially covers the latter at one end of the pipe, so that these reinforcing means ensure the mechanical continuity of the ducting.

Advantageously, this securing is achieved by overmolding said thermosetting matrix involved in the infusion in the case of alternative (i) of method a), while gripping the reinforcing means on their two radially inner and outer faces with two collars, each of which has a flange.

The infusion operation may thus also serve to overmold these end flanges directly on the pipe, while ensuring continuity to mechanical forces with the drape-formed reinforcing means.

Also advantageously, each flange is shrunk-on or rotation welded or welded by ultrasound on the radially inner face of the inner layer of the pipe, this flange then being preferably made of a thermoplastic material or composite thermoplastic.

It will be noted that the ends of the inner core (i.e. typically of the inner layer) may be previously thermoformed in order to facilitate assembly of the flanges.

BRIEF DESCRIPTION OF THE DRAWINGS

Other features, advantages and details of the present invention will become apparent on reading the following description of various embodiments of the invention, given as non-limiting examples, said description being made with reference to the appended drawings, in which.

DETAILED DESCRIPTION

Figure 1:
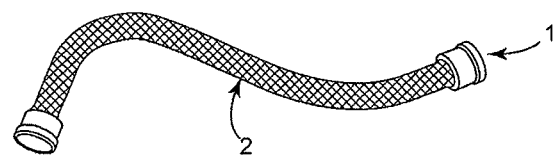
FIG. 1 is a drawing showing, in perspective, a three-dimensional ducting according to the invention.
Figure 2:
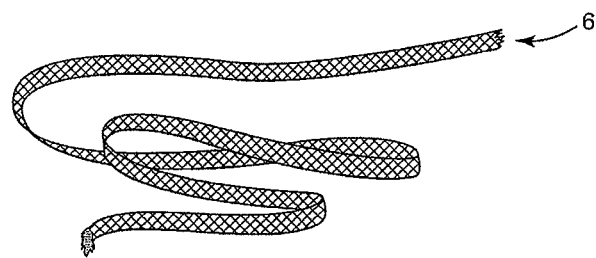
FIG. 2 is a drawing showing, in perspective, a braid in the unrolled state, that may be used as a reinforcing means in the reinforcing layer of this ducting according to the invention.
Figure 3:
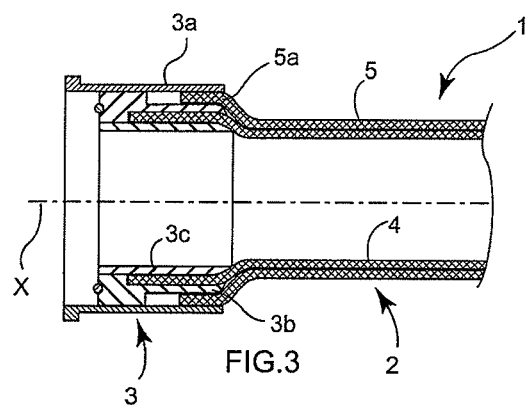
FIG. 3 is a partial schematic view in axial section of a ducting formed of a pipe provided with connecting flanges, according to an example of an embodiment of the invention.

As may be seen in FIG. 3, a ducting 1 according to the invention, which comprises a pipe 2, at the ends of which flanges 3 are connected, is such that the pipe 2 substantially comprises:

a radially inner layer 4 made of a thermoplastic material or thermoplastic elastomer (preferably made of polyamide) that is leakproof and chemically resistant to the fluid transported (for example fuel) this layer being for example hot-formed independently of the reinforcing layer 5 that it is designed to receive in the case of method a) according to the invention, so as to give the pipe a preferably three-dimensional curved and/or bent geometry, as may be seen in FIG. 1, and the reinforcing layer 5 that surmounts the inner layer 4 (as previously indicated, one or more intermediate layers could be inserted radially between these layers 4 and 5) and that is made of a composite material based on the reinforcing means 6 (such as one or more carbon braids—see FIG. 2—preferably braided at an angle of approximately 54° over at least part of its length so as to hold this layer 5) directly drape-formed over this layer 4, in equilibrium under pressure.

More precisely, and still in the example of method a) according to the invention, these reinforcing means 6 are of choice:

(i) impregnated with a thermosetting matrix, the layer 5 forming a thermosetting composite, or (ii) either reinforcing fibers intermixed with thermoplastic fibers or powders, or fibers impregnated with a plastic polymeric coating that may be chemically cured, preferable by "RIM" reaction-type molding, for example based on a polyurethane, the reinforcing layer forming a thermoplastic composite.

Preferably, these reinforcing means 6 according to method a) are dry drape-formed over the layer 4 and then infused under vacuum in contact therewith, by means of a flexible vacuum sheet, with a thermosetting resin overmolded in the liquid state, as for example, in a non-limiting manner, an epoxy resin. In this way, the layer 4 forms a core both for the drape-forming and infusion of these reinforcing means 6. The structure obtained is then cured in an oven under vacuum.

As illustrated in FIG. 3, the connecting flanges 3 of the pipe 2 may be advantageously secured to the drape-formed reinforcing means 6 (e.g. the braid or braids) so that each flange partially covers the reinforcing means 6 at one end 5a of the layer 5 while being closely bonded to the latter. According to the invention, this securing is achieved by overmolding with the liquid thermosetting resin used during infusion, while gripping the end 5a of the reinforcing means 6 by two radially outer and inner collars 3a and 3b, each of which has a flange 3.

Each flange 3 may also be shrunk-on or rotation welded (i.e. by friction) in the preferred case where it is made of a thermoplastic material or composite thermoplastic, onto the radially inner face of the inner layer 4 of the pipe 2, via an inner portion 3c of this flange 3.

In this way, the reinforcing means 6 thus consolidated with resin, ensure, after this is cured, the mechanical continuity of the ducting 1 to the forces of which it is the source in use.

As previously explained with reference to method b) according to the invention, it is also possible to cover the inner layer 4 directly, in its initial rectilinear geometry, with the reinforcing layer 5, where the reinforcing means 6 are reinforcing fibers intermixed with a thermoplastic material (equally in the form of fibers, films or powder) and then to give the previously softened structure its final curved and/or bent geometry by a blow-molding technique in a suitable mold.

The invention claimed is:

1. A method for producing a ducting comprising the following sequential steps:

A) fonning a thermoplastic or thermoplastic elastomeric inner layer by extrusion, with optional deposition of at least one intermediate layer on said inner layer, so as to obtain a blank with a geometry that is either rectilinear, curved and/or bent, then B) bag molding or drape-forming in situ a reinforcement directly onto said blank, which constitutes in this way a functional core for bag molding or drape-forming, to obtain a reinforced structure, then C) consolidating in situ said reinforcement in contact with said core by a thermosetting or thermoplastic matrix with the following successive sub-steps, only in the case where step B) is carried out on a blank with rectilinear geometry:

C1) preheating the rectilinear reinforced structured obtained in step B) to its softening temperature, and C2) curving or bending by flow-molding in a mold the preheated reinforced structure, to obtain a multilayer structure with curved and/or bent geometry, then D) curing and/or cooling said multilayer structure so as to obtain the curved and/or bent pipe with a composite reinforcing layer.

2. The method according to claim 1, wherein step A) further comprises a hot forming to curve and/or bend said blank which initially has a rectilinear geometry and which after said hot forming forms a curved and/or bent core having a three-dimensional geometry, in the end of step A) and before step B).

3. The method according to claim 2, wherein said hot forming of step A) is carried out:

either by locally heating the blank for bending with pre-heating, or by heating all the blank to a predetermined temperature enabling it to be softened and by blow-molding or by thermoforming in a mold under a very low internal pressure and without an inflatable bag.

4. The method according to claim 2, wherein steps B) and C), are put into practice by drape-forming said reinforcement as one or more braids made of carbon, on the curved and/or bent core formed in the end of step A), with:

either dry drape-forming of said reinforcement in step B) followed by an infusion of said reinforcement carried out under vacuum in step C) by said thermosetting matrix over molded in a liquid state, said curved and/or bent core constituting in this way a functional core for drape-forming and infusion, or the use for said drape-forming of a prepreg that is consolidated in contact with the curved and/or bent core in step C).

5. The method according to claim 4, wherein said dry drape-forming is carried out followed by infusion using a flexible sheet or vacuum bag.

6. The method according to claim 2, wherein steps B) and C), are put into practice:

either by winding around the core a continuous composite element as a thread or strip that contains said reinforcing fibers intermixed with said thermoplastic fibers or powders, or by impregnating said reinforcement with said plastic polymeric coating that can be chemically cured by molding of the "RIM" reaction type by means of a polyurethane.

7. The method according to claim 1, wherein step B) is carried out directly on a blank with a rectilinear geometry obtained in step A), without hot-foaming this blank.

8. The method as claimed in claim 1, wherein the curing step D) is carried out under vacuum in an oven.

9. The method as claimed in claim 2, wherein the method additionally includes the securing in step C) of the connecting flanges of the pipe to said reinforcement so that each flange partially covers the latter at one end of the pipe, so that said reinforcement ensure the mechanical continuity of the ducting.

10. The method according to claim 5, wherein said securing is achieved by overmolding said thermosetting matrix involved in the infusion while gripping said reinforcement on their two radially inner and outer faces with two collars, each of which has a flange.

11. The method according to claim 9, wherein each flange, that is made of a thermoplastic or composite thermoplastic material, is shrunk-on or rotation welded or welded by ultrasound onto the radially inner face of the inner layer of the pipe.

12. The method according to claim 1, wherein said inner layer is made of thermoplastic material based on at least one thermoplastic polymer selected from the group consisting of polyamides (PA), polyetherimides (PEI), phenylene polysulfides (PPS), polyetheretherketones (PEEK), polyetherketoneketones (PEKK) and mixtures thereof, and a thermoplastic elastomer that is leakproof and chemically resistant to a fuel transported in said ducting.

13. The method according to claim 1, wherein said reinforcing layer is situated radially above the inner layer.

14. The method according to claim 1, wherein said ducting has at least one multilayer pipe comprising:
- a radially inner layer that is made of thermoplastic material based on at least one thermoplastic polymer selected from the group consisting of polyamides (PA), polyetherimides (PEI), phenylene polysulfides (PPS), polyetheretherketones (PEEK), polyetherketoneketones (PEKK) and mixtures thereof, or of a thermoplastic elastomer, and that is leakproof and chemically resistant to the fuel transported, and
- at least one reinforcing layer situated radially above the inner layer, wherein the pipe has a curved and/or bent three-dimensional geometry, and in that the reinforcing layer is made of a composite material based on a reinforcement in intimate and direct contact with the subjacent layer, said geometry being obtained by one of the following two methods a) and b):

a) the inner layer is previously hot formed independently of the reinforcing layer so as to pass from an initial rectilinear geometry to this curved and/or bent geometry, said reinforcement being of choice:
  (i) based on at least one cylindrical fibrous braid impregnated with a thermosetting matrix, the reinforcing layer forming a thermosetting composite with a thermosetting matrix having a curing temperature lower than the melting point of said subjacent layer, or
  (ii) based on at least one cylindrical fibrous braid intermixed with thermoplastic fibers or powders, or impregnated with a plastic polymeric coating that is curable chemically, the reinforcing layer forming in both these cases a thermoplastic composite with a thermoplastic matrix having a transformation temperature less than that of said subjacent layer; or b) the inner layer, in its initial rectilinear geometry, is first of all covered with the reinforcing layer in which said reinforcement are based on at least one cylindrical fibrous braid intermixed with a thermoplastic material in the form of fibers, film or powder, and this inner layer covered in this way is then blow-molded after being softened in order to give the pipe its curved and/or bent geometry, the reinforcing layer obtained forming a composite with a thermoplastic matrix.

* * * * *

UNITED STATES PATENT AND TRADEMARK OFFICE
CERTIFICATE OF CORRECTION

| | | |
|---|---|---|
| PATENT NO. | : 9,222,605 B2 | Page 1 of 1 |
| APPLICATION NO. | : 14/448144 | |
| DATED | : December 29, 2015 | |
| INVENTOR(S) | : Ciolczyk et al. | |

It is certified that error appears in the above-identified patent and that said Letters Patent is hereby corrected as shown below:

Title page:
Item (72) Inventors: "Paucort (FR)" should read --Paucourt (FR)--.

In the claims:
Column 10,
Line 1, Claim 1, "fonning" should read --forming--;
Line 65, Claim 7, "hot-foaming" should read --hot-forming--.

Signed and Sealed this
Seventh Day of June, 2016

Michelle K. Lee
*Director of the United States Patent and Trademark Office*